June 6, 1950  A. W. BAUMANN  2,510,275
EVAPORATOR

Filed April 25, 1946  2 Sheets-Sheet 1

Inventor:
Arnold W. Baumann
By
Churton, Schroeder, Merriam & Hofgren
Attorneys

June 6, 1950 A. W. BAUMANN 2,510,275
EVAPORATOR
Filed April 25, 1946 2 Sheets-Sheet 2

Inventor:
Arnold W. Baumann
By Shutton, Schroeder,
Miriam & Hofgren
Attorneys

Patented June 6, 1950

2,510,275

UNITED STATES PATENT OFFICE 2,510,275

EVAPORATOR

Arnold W. Baumann, Chicago, Ill.

Application April 25, 1946, Serial No. 664,851

4 Claims. (Cl. 183—79)

This invention relates to evaporators of the type used for making condensed milk, or the like, and more particularly to an improved entrainment separator for an evaporator, to remove and recover spray particles or droplets which are carried along with the vapors to the separator chamber.

The primary object of the invention is to provide an improved entrainment separator which will be more efficient in removing droplets from the vapor and which may be cleaned readily.

Another object of the invention is to provide an improved stack which is placed along the side wall of the unit and is provided with a weighted separator plate which will automatically accommodate itself to various velocities of vapor travelling through the stack.

The invention is illustrated in an improved embodiment in the accompanying drawings, in which—

Figure 1:
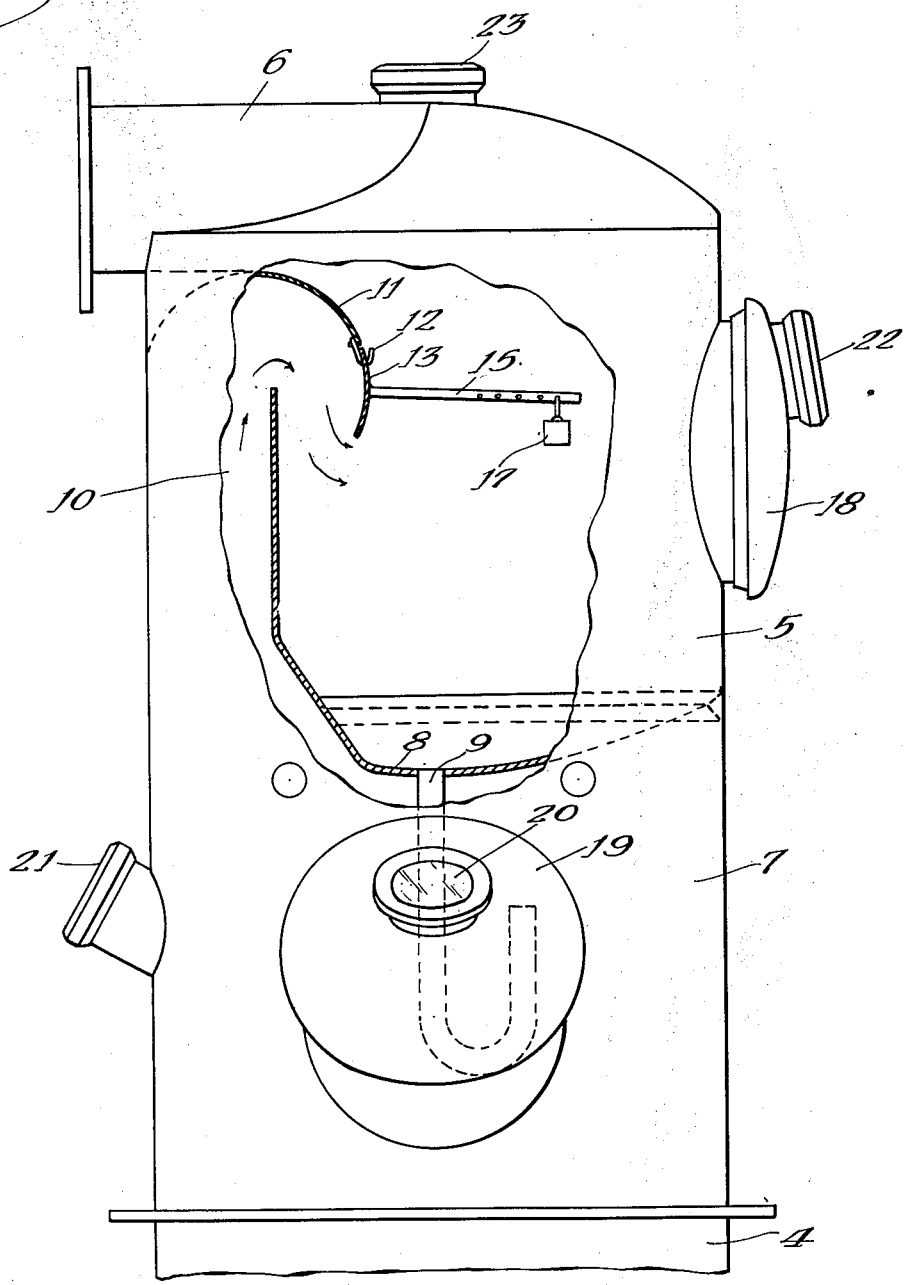
Figure 2:
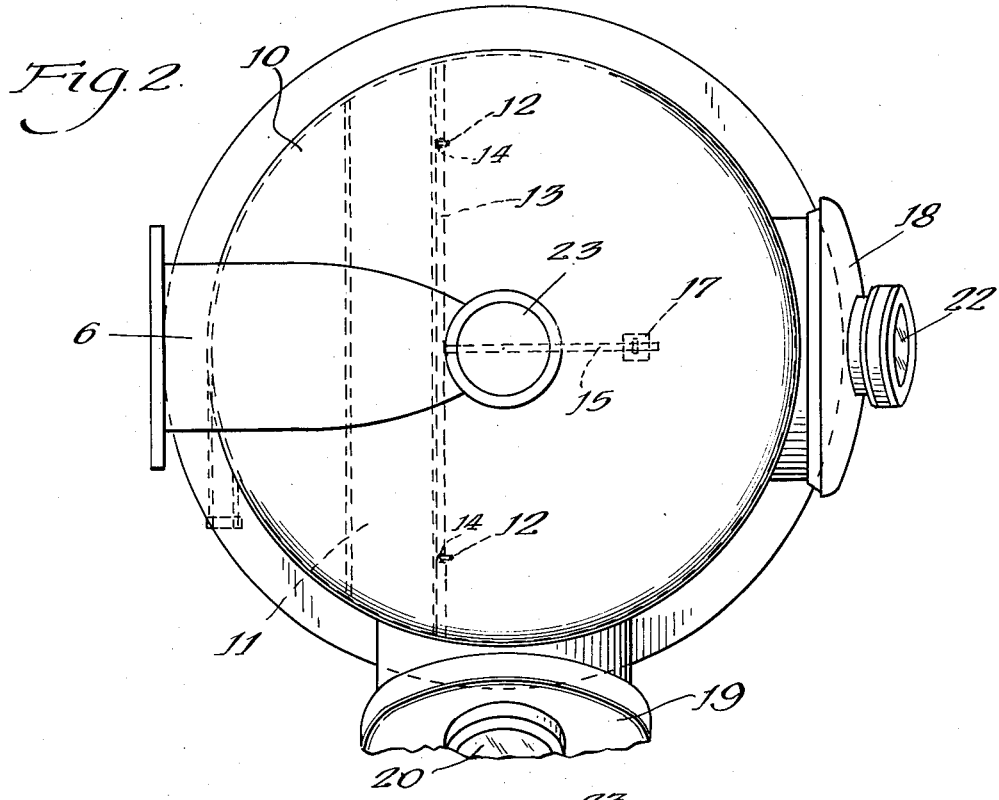

Figure 1 is a fragmentary elevational view, partly in section, showing an evaporator unit embodying the invention; Fig. 2, a top plan view of the same; and Fig. 3, a fragmentary elevational view similar to Fig. 1, but taken at a 90° angle.

In the embodiment illustrated, the evaporator unit is in the form of a cylindrical tank having a heating chamber 4 and a superposed entrapment separator 5, which is provided at its top with an outlet conduit 6. A vapor space 7 above the liquid heating unit is separated from the entrapment chamber by a dish-shaped partition 8, which is provided at its lowermost portion with a J-shaped drain tube 9 for returning milk solids into the vacuum pan or heating chamber. All of the parts are preferably made of stainless steel, and the joints are welded to avoid crevices and facilitate cleaning.

Figure 3:
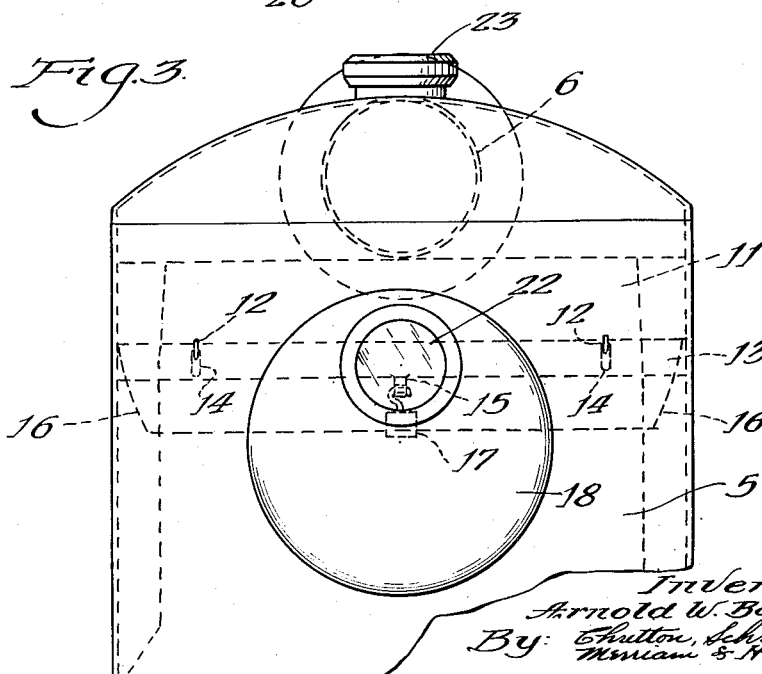

Vapor is conducted from the vapor space to the separator chamber by means of a stack 10 whose cross-section is in the form of a circular segment, as shown in Fig. 2. The upper portion of the stack is curved downwardly, as indicated at 11, so as to direct the vapor downwardly towards the partition 8. A pair of hooks 12 are provided on the end of the member 11, and a separator plate 13 is loosely suspended thereon by means of slots 14. Preferably the separator is concave toward the stack, and is provided with a weighted arm 15 which urges it to a position which will restrict the flow of vapor into the entrainment chamber. As shown in Fig. 3, the lower end portions of the plate are cut away, as indicated at 16, so that the plate will be free to swing against the curved walls of the entrainment chamber.

In order to remove entrained liquid efficiently from moving vapor, direction of flow should be changed rapidly, and the velocity of flow reduced by moving the vapor into a larger chamber. As the rate of evaporation may change during the operation of the evaporator unit, it is desirable to have the gravity operated separator plate able to accommodate itself to slight variations in the flow. This will be taken care of readily by the weighted arm 15, and once the weight 17 has been placed in proper position, no further adjustment is necessary.

An evaporator unit handling milk must be kept scrupulously clean, and this usually involves opening the unit each day and cleaning the parts thoroughly. For this purpose, a manhole cover 18 is provided in the entrainment chamber, and the simple construction enables the separator plate to be unhooked and cleaned outside of the unit. Heretofore, the communicating stack has been centrally disposed, and in smaller units it has been very difficult for the workmen to get in and do the required cleaning. The vapor space in the heating chamber is also provided with a manhole cover 19, having a window 20 through which the flow of liquid from the drain tube 9 may be observed. Other windows 21, 22 and 23 are provided so that the internal parts of the units may be observed during operation.

The foregoing detailed description is given for clearness of understanding only, and no unnecessary limitations should be understood therefrom, for some modifications will be obvious to those skilled in the art.

I claim:

1. In a separator unit for use in an evaporator of the type used for making condensed milk and the like, a vertical tank having external confining side and end walls, a dish-shaped partition in the tank at an intermediate portion of its height and extending laterally from one side of the tank to an inner edge intermediate of the vertical center line and opposite side of the tank, a stack wall extending upwardly from said inner edge of the partition to form a stack between the adjacent side of the tank and the stack wall, and an upwardly, inwardly and downwardly curved wall spaced upwardly from the top of said stack wall and extending inwardly from the side of the tank, over and inwardly of the stack wall to guide vapors from the space below the partition upwardly through the stack and then downwardly into the space above the partition whereby entrained liquid in the vapor will fall onto the dish-shaped partition, a manhole cover removably covering an opening in the tank side wall opposite the space above said partition to provide for unobstructed access into said space above the portion for easily cleaning the walls thereof, and a deflector plate swingably hinged at the inner edge of the curved wall above the stack wall, to yieldingly restrict the flow of vapor into the space above the partition.

2. In a separator unit for use in an evaporator of the type for making condensed milk and the like, a vertical cylindrical tank having confining side and end walls, a laterally extending partition in the tank intermediate of its height and spaced from the tank side at its inner edge, a stack wall extending upwardly from said inner edge of the partition and having its top spaced downwardly from the top end wall of the tank, said partition and stack wall forming an entrainment chamber above the partition and a vapor space below the partition, a curved wall extending inwardly from the tank side and spaced upwardly from the top of said stack wall, the space between the stack wall and the adjacent side of the tank and below said curved wall forming a stack leading from said vapor space into the entrainment chamber, a separator plate swingably mounted on the inner edge of said curved wall and extending down below the top edge of the stack wall, a laterally extending arm fixed to said separator plate, and a weight adjustably mounted on said arm for yieldably restricting the flow of vapor through the stack and into the entrainment chamber, and a manhole cover in the tank wall opposite the entrainment chamber for providing easy cleaning access to the walls of the entrainment chamber.

3. A separator unit as claimed in claim 2 in which said separator plate is removably hooked onto the inner edge of said curved wall for easy removal for cleaning purposes when the manhole cover is open.

4. A separator unit as claimed in claim 2, in which the cross section of said stack between the tank side and the stack wall is of segment shape, and the ends of the swingable separator plate are cut away to curve inwardly and downwardly so that the plate will be free to swing against the curved walls of the entrainment chamber, and a drain tube in the partition for conducting collected liquid from the entrainment chamber to the vapor space below the partition.

ARNOLD W. BAUMANN.

REFERENCES CITED

The following references are of record in the file of this patent:

UNITED STATES PATENTS

| Number | Name | Date |
|---|---|---|
| 198,919 | Urie | Jan. 1, 1878 |
| 894,407 | Suzuki | July 28, 1908 |
| 1,416,215 | Kirkup | May 16, 1922 |
| 1,420,366 | Davis | June 20, 1922 |
| 2,015,680 | Kermer | Oct. 1, 1935 |
| 2,057,257 | Walker | Oct. 13, 1936 |
| 2,172,133 | Thuilland | Sept. 5, 1939 |
| 2,234,826 | Koppers | Mar. 11, 1941 |
| 2,246,349 | Crum | June 17, 1941 |
| 2,359,078 | Baumann | Sept. 26, 1944 |

FOREIGN PATENTS

| Number | Country | Date |
|---|---|---|
| 611,307 | Germany | Mar. 26, 1935 |